(12) United States Patent
Seeds

(10) Patent No.: US 9,386,757 B1
(45) Date of Patent: Jul. 12, 2016

(54) MOBILE ANIMAL WASTE COLLECTION STATION

(71) Applicant: Althea L. Seeds, Allentown, PA (US)

(72) Inventor: Althea L. Seeds, Allentown, PA (US)

(*) Notice: Subject to any disclaimer, the term of this patent is extended or adjusted under 35 U.S.C. 154(b) by 0 days.

(21) Appl. No.: 14/555,906

(22) Filed: Nov. 28, 2014

Related U.S. Application Data

(60) Provisional application No. 61/909,692, filed on Nov. 27, 2013.

(51) Int. Cl.
*A01K 29/00* (2006.01)
*A01K 1/01* (2006.01)

(52) U.S. Cl.
CPC .................................. *A01K 1/01* (2013.01)

(58) Field of Classification Search
CPC .................................. A01K 1/01; F16L 3/04
USPC ............... 280/79.5, 79.7; 248/65, 205.2, 907; 119/161, 174; D30/161
See application file for complete search history.

(56) References Cited

U.S. PATENT DOCUMENTS

| | | | | |
|---|---|---|---|---|
| D151,008 S * | 9/1948 | Rycraft | | B62B 1/12 280/13 |
| 2,704,165 A * | 3/1955 | Hoover | | B62B 1/264 280/47.24 |
| 2,704,673 A * | 3/1955 | Bower | | 280/47.19 |
| 2,743,115 A * | 4/1956 | Rutledge | | B62B 1/042 280/13 |
| 4,294,463 A * | 10/1981 | Kotani | | B62B 1/12 224/257 |
| 4,640,521 A * | 2/1987 | Berfield | | 280/47.34 |
| 4,887,835 A * | 12/1989 | Dallaire et al. | | 280/646 |
| 5,193,842 A * | 3/1993 | Fontenot | | 280/645 |
| 5,203,579 A * | 4/1993 | Lipschitz | | B62B 3/1472 248/129 |
| 5,380,033 A * | 1/1995 | Harling | | 280/654 |
| 5,725,351 A * | 3/1998 | Guibert et al. | | 280/646 |
| 5,957,145 A * | 9/1999 | Plumer | | B62B 1/262 135/117 |
| 6,131,925 A * | 10/2000 | Weldon | | B62B 1/12 280/30 |
| 6,447,002 B1 * | 9/2002 | Fang | | A45C 13/385 280/47.29 |
| 6,550,860 B2 * | 4/2003 | Lombardi | | A47C 9/08 220/915.2 |
| 6,929,269 B2 * | 8/2005 | Oliver | | 280/47.18 |
| D523,203 S * | 6/2006 | Pertuset | | D34/24 |
| 7,178,812 B1 * | 2/2007 | Bryan | | B62B 1/14 280/248 |
| 7,438,300 B1 * | 10/2008 | Zien et al. | | 280/79.5 |
| 7,857,328 B1 * | 12/2010 | Boss | | 280/47.25 |
| 7,997,595 B1 * | 8/2011 | Pope | | 280/47.26 |
| 2002/0185831 A1 * | 12/2002 | Chan | | 280/47.26 |
| 2007/0290471 A1 * | 12/2007 | Sexton | | 280/79.5 |
| 2008/0295280 A1 * | 12/2008 | Goodger | | 15/347 |
| 2009/0149279 A1 * | 6/2009 | Fischer | | A63B 9/0002 473/417 |
| 2009/0283979 A1 * | 11/2009 | Sands | | 280/79.7 |
| 2013/0334797 A1 * | 12/2013 | Umbro et al. | | 280/654 |

FOREIGN PATENT DOCUMENTS

EP 302842 A2 * 2/1989 ............... B62B 3/10

* cited by examiner

*Primary Examiner* — Kristen C Hayes
*Assistant Examiner* — Ebony Evans
(74) *Attorney, Agent, or Firm* — Clinton H. Wilkinson; Charles A. Wilkinson

(57) ABSTRACT

A mobile animal waste collection station which facilitates the collection and disposal of animal waste in a sanitary manner is provided, which station includes a mobile station having a base frame supported on a plurality of wheels, a shaft extending from the base frame and terminating in a handle section, a waste collection receptacle securable to the base frame, an animal waste pickup tool such as a "pooper scooper" which is detachably securable to the shaft, and other tools and supplies for use in the waste collection and disposal process, whereby the collection station can be easily transported between waste pickup locations.

13 Claims, 4 Drawing Sheets

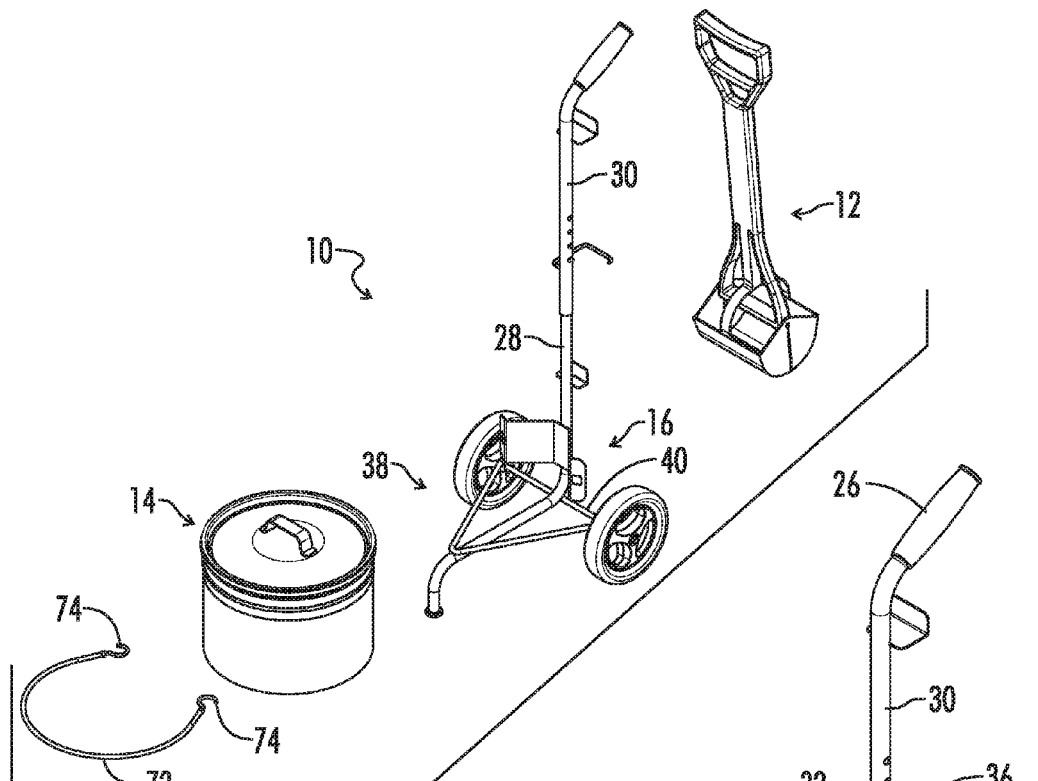
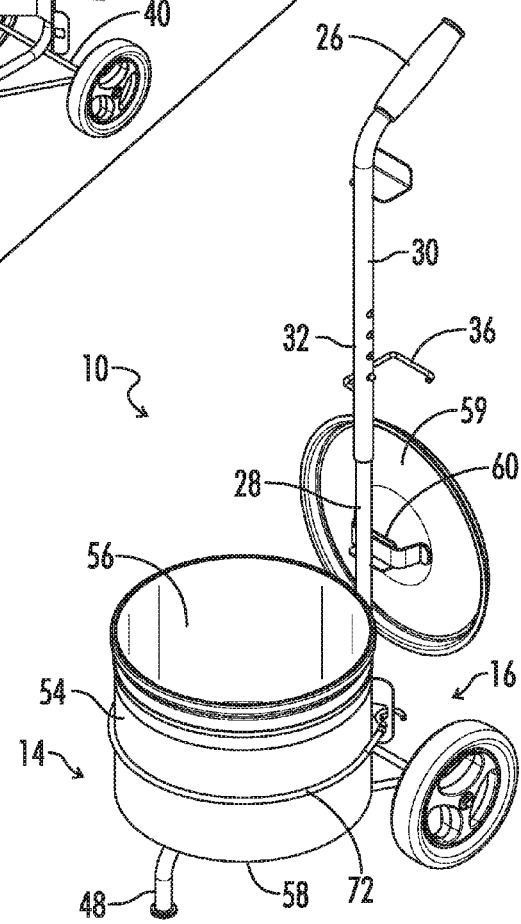

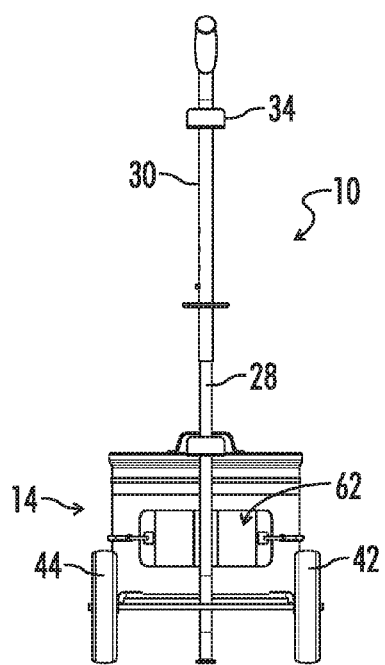
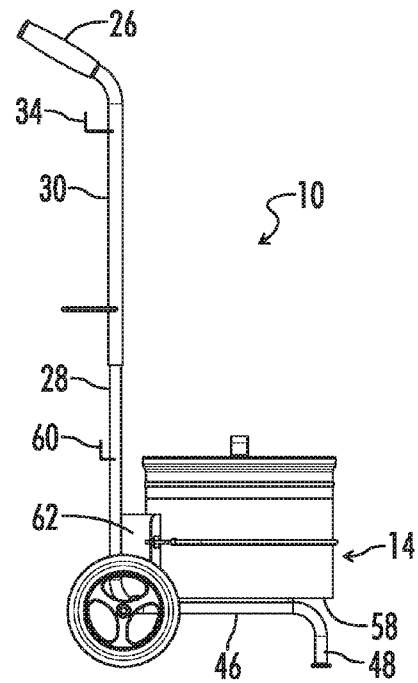
FIG. 8  FIG. 9
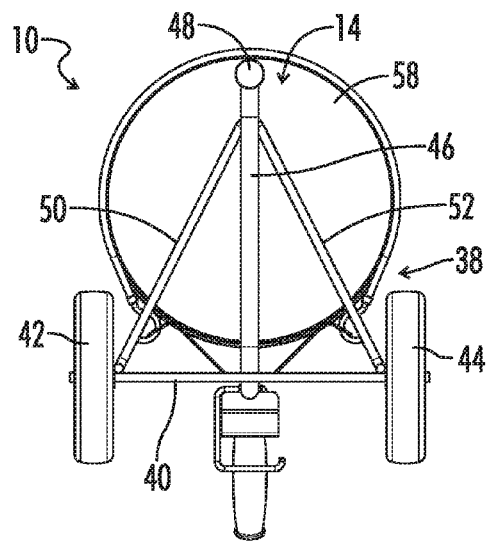
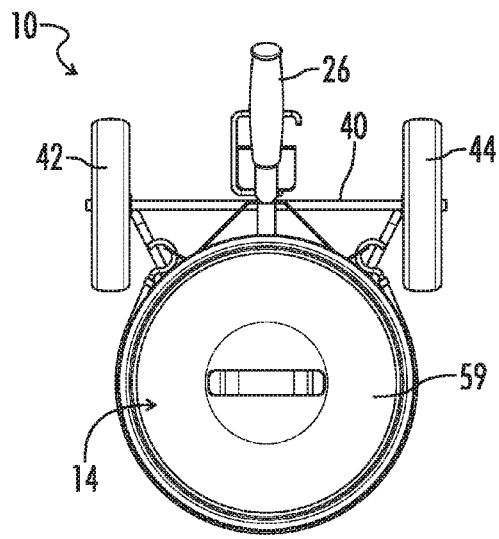
FIG. 10  FIG. 11

MOBILE ANIMAL WASTE COLLECTION STATION

FIELD OF THE INVENTION

The present invention relates to systems and devices which facilitate picking up, collecting, and then disposing of waste such as animal waste, particularly fecal matter, and more particularly to a mobile animal waste collection station used during collection of animal waste and for storing tools and materials utilized in the waste collection process.

BACKGROUND OF THE INVENTION

Numerous devices and aids have been particularly designed for use in connection with the generally unpleasant task of retrieving and collecting animal waste, particularly fecal matter originating from domestic animals. Perhaps the most well-known of such devices is the so-called "pooper scooper" of which there are many different types but typically include a set of mechanical jaws which are manually actuated by the user to grasp and pick up fecal deposits. Many pet owners find these devices awkward and difficult to use and carry, particularly those who take long walks with their pets, as well as those who walk more than one pet at a time on a leash. Such pet owners often find it more convenient to simply manually pick up any fecal matter deposits using a plastic glove, bag, paper towel or the like, which is then disposed of in the nearest refuse container, or if a trash receptacle is not immediately available, the collected waste is carried home in the bag or towel for later disposal. As most pet owners will appreciate, the animal waste collection process sometimes becomes more chaotic and messier than expected, and the experienced, well-prepared pet owner will carry additional sanitary materials such as wet or dry towels or the like for cleaning one's hands or even the pet.

There are also various circumstances in which fecal deposits from multiple domestic animals must be repeatedly collected within the same confined area. For example, a large number of domestic pet owners have two, three, or more dogs which are allowed to freely roam or run within a fenced-in yard or other enclosure, primarily for purposes of exercise and play. This leads inevitably to the task of collecting a plurality of fecal deposits. There are also a growing number of community off-leash dog parks and pet recreation areas, wherein while the individual pet owners are required to pick up any waste originating from their animals, in practice such rules are not always strictly followed, and an attendant or volunteer therefore must clean up the park area. Workers at farms, kennels, animal daycare facilities and hospitals, and other animal related organizations also must continually pick up animal waste on a daily basis.

It therefore would be desirable for owners of both individual and multiple pets, attendants at kennels, and others to have a wheeled mobile pet waste collection station available to them by which equipment used in the collection of pet waste, including but not limited to embodiments of a so-called "pooper scooper" or tool for picking up pet waste, a removable receptacle in which the gathered waste can be placed and transported for later disposal, and one or more other waste pickup aids or accessories which can be removed from the station and used and therefore are easily and conveniently available for use.

BRIEF SUMMARY OF THE INVENTION

A mobile animal waste collection station for supporting a receptacle in which material such as collected animal waste may be congregated for eventual disposal is provided. The collection station includes a mobile station having a base frame, a shaft extending upwardly from the base frame and terminating in a handle section, and a plurality of wheels attached to the base frame. In addition, a waste collection receptacle is provided which is detachably securable to the base frame. In one embodiment, a latch mechanism is provided including a female latch member attached to the upwardly extending shaft and a male latch member attached to the receptacle which is securable in the female latch member. In another embodiment, a plurality of different-sized receptacles having a similar male latch member is provided, so that the receptacles can be interchangeably secured to the collection station carriage apparatus. The mobile station is also adapted to support an animal waste pickup tool such as a "pooper scooper," in one embodiment secured to the upwardly extending shaft above the wheels of the mobile station. In an embodiment, a package of bags which are dispensable from the package is also provided, which package is preferably adapted to be stored in the bottom of the waste collection receptacle. In one embodiment, a light apparatus is provided, while in another embodiment a storage area for wipes or towels and a cleaning solution may also be provided. The waste collection station of the present invention is adapted to facilitate the pickup and disposal of pet excrement by providing an easily transported mobile station at which all of the necessary tools, aids, and supplies to be used in such collection process are stored and readily available for use, as well as providing a receptacle for collecting and then disposing of such waste. Currently there is no single product that provides all the features and functions of the present invention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is an exploded view of an embodiment of the waste collection station.

FIG. 4 is an isometric view of the waste collection station with the vessel lid in a storage position;

FIG. 8 is a rear view thereof;

FIG. 9 is a second side view thereof;

FIG. 10 is a bottom view thereof; and

FIG. 11 is a top view thereof.

DETAILED DESCRIPTION OF THE INVENTION

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

The present invention advantageously provides a mobile pet waste collection and disposal station and system which overcomes the limitations of the prior art and provides a pet waste pickup and disposal system and method that facilitates the collection and disposal of pet waste.

Figure 1:
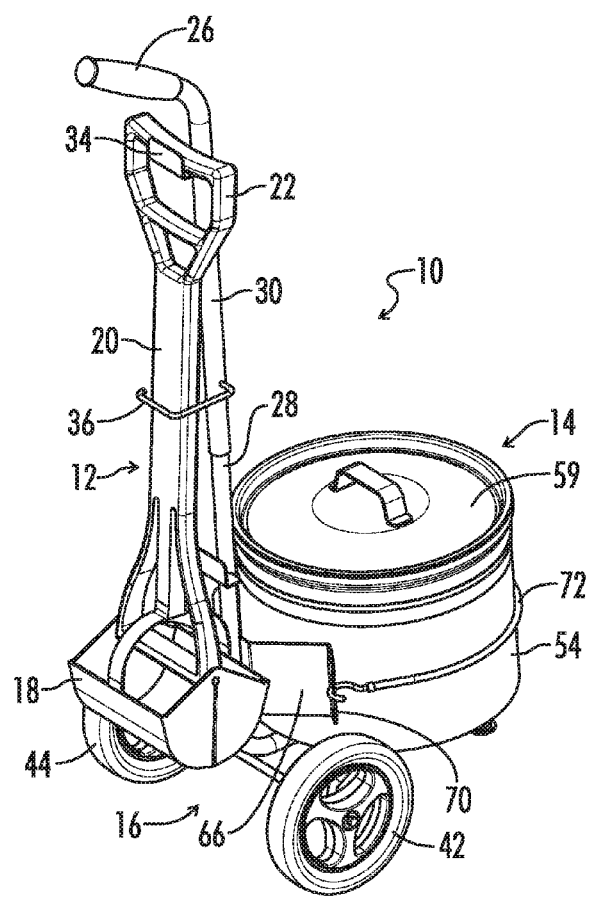
FIG. 1 is an isometric view of an exemplary embodiment of the waste collection station of the invention.
Figure 2:
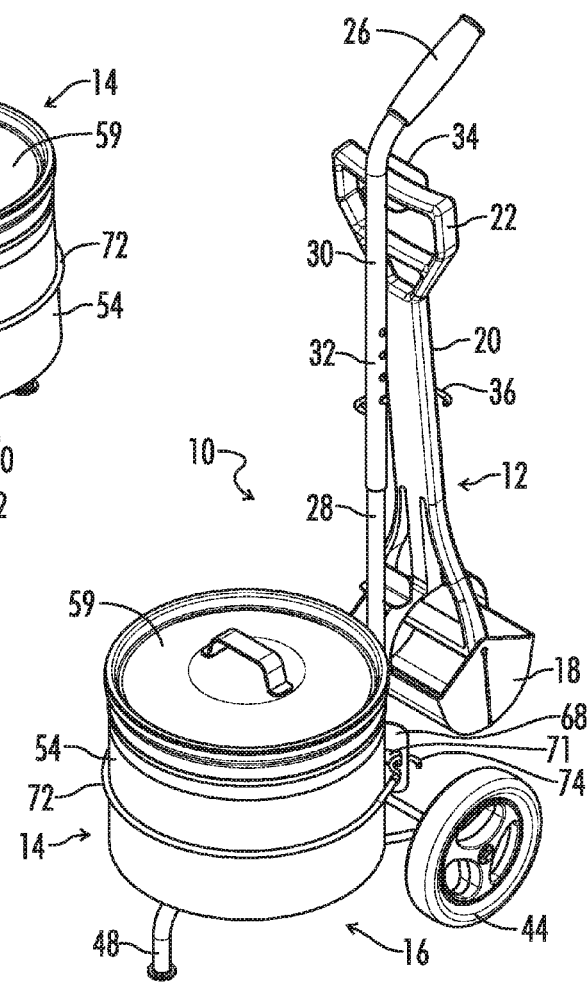
FIG. 2 is an isometric view of the embodiment shown in FIG. 1 from the opposite side.
Figure 5:
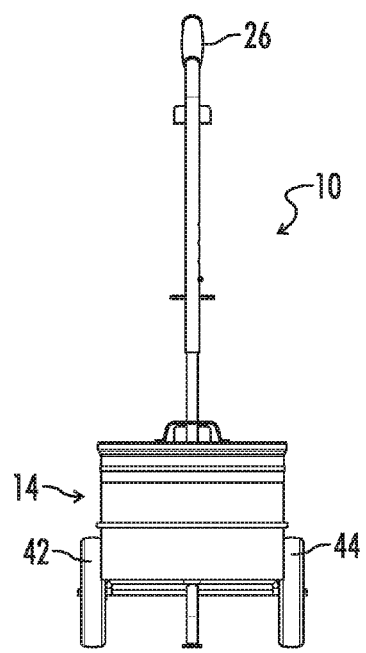
FIG. 5 is a front view of the waste collection.

Referring now in detail to the drawings, and in particular FIGS. 1-3, there is shown an embodiment of an animal waste collection station 10 in accordance with the invention. Collection station 10 includes a "pooper scooper" device 12 for use in picking up animal waste, a vessel 14 in which animal waste that is picked up using the device 12 or otherwise is placed and collected for later disposal, and a mobile station 16 including a support or holding means for at least the device 12 and the vessel 14.

The animal waste pickup tool or "pooper scooper" device 12 is a type of device used for picking up animal feces from a lawn or other surface, and may be of any suitable or conventional type. Device 12 may include a set of jaws 18 which are operatively connected to an elongated arm section 20 having a handle 22 and a means for manually opening and closing the set of jaws 18. The device is generally used by grasping the handle 22, activating a lever means to open the jaws 18, and positioning the jaws 18 around and in close proximity to the excrement material to be collected so that the excrement is situated between the open jaws. The lever means is then manually operated to close the jaws so that they slide underneath the excrement which can then be picked up. Other types of excrement pickup devices may include a collection vessel and a matching rake or other jawed utensil which is used to lift or push the excrement into the collection vessel; a bag attached to a wire frame secured to the end of an elongated support stick; or as an alternative to a mechanical device, a plurality of "poop bags" which are essentially plastic bags used to manually pick up the excrement.

Figure 7:
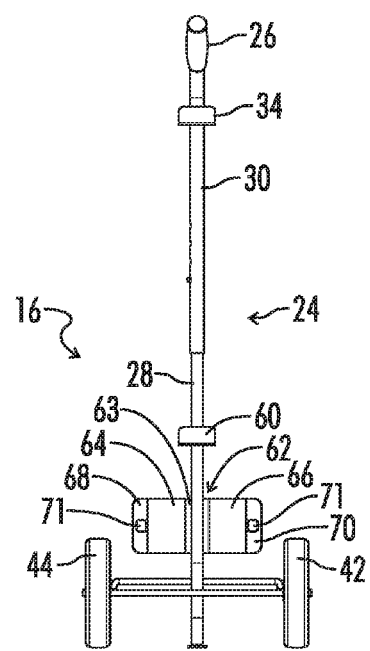
FIG. 7 is a rear view thereof station with the waste collection apparatus removed.

In the illustrated embodiment, as best shown in FIG. 7, mobile station 16 includes an elongated shaft section 24 having an angled extension on its upper end, forming a handle 26 for manually moving or guiding collection station 10. The intent of the mobile station 16 is to provide an apparatus that is easily moved across a lawn or other area where pet excrement is present and must be picked up. Shaft 24 may be adjustable in length or height, and in the exemplary embodiment includes a lower shaft section 28 and an upper shaft section 30 that is telescopingly adjustable on lower shaft section 28. The telescoping connection includes a locking mechanism 32 for locking the shaft sections together at the desired length, which locking mechanism may include, as shown in FIG. 2, a plurality of spaced apart apertures in upper shaft section 30 and a spring-loaded ball or button in lower shaft section 28 that is insertable into one of the apertures in upper shaft section 30 to lock the shaft sections 28 and 30 to provide a desired length. In another embodiment, the locking mechanism 32 may include a locking collar that locks upper shaft section 30 at a desired position with respect to a lower shaft section 28 in a manner that will be familiar to those skilled in the art.

Figure 6:
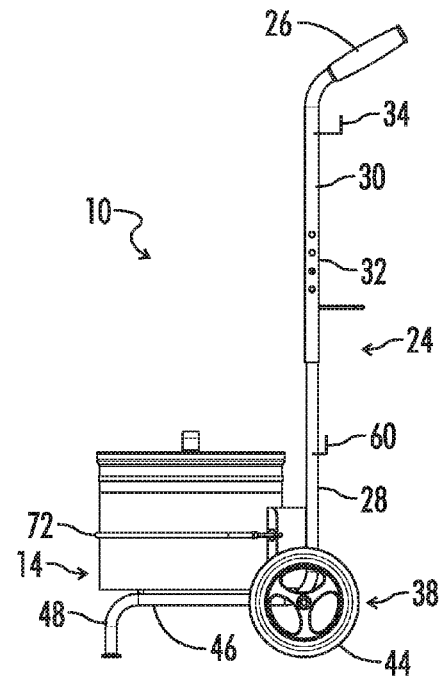
FIG. 6 is a first side view thereof.

A mounting bracket 34 is provided on upper shaft section 30 of mobile station 16 for as shown in FIGS. 1 and 2 supporting or attaching a waste collection device 12 by its handle on mobile station 16. In addition, a stabilization means in the form of a swing or pivot inhibitor bracket 36 is provided on upper shaft section 30 spaced apart from mounting bracket 34 at a lower position on upper shaft section 30, which bracket 36 holds the lower end of device 12 including jaws 18 in close proximity to shaft 24 of mobile station 16, preventing jaws 18 from swinging loosely when station 16 is being moved from location to location. As shown in FIGS. 3 and 6, lower shaft section 28 is connected on its lower end to base frame 38. In the exemplary embodiment, base frame 38 includes at least one crosspiece or shaft 40 (see also FIGS. 10 and 11) which extends approximately equally from either side of the point of connection to lower support shaft 28. A pair of wheels 42 and 44 is then rotatably mounted on the opposite ends of the shaft 40.

Bracket 34 on upper shaft section 30 should be positioned at a height such that the jaws 18 of pet waste collection apparatus 12 do not drag on the ground or interfere with the rotation of wheels 42 and 44, and apparatus 12 is preferably sitting higher than wheels 42 and 44. Wheels 42 and 44 are preferably solid rubber wheels which are large enough to allow the collection station 10 to be easily pushed or to travel over obstacles that might be present in a bumpy ground surface such as grass or the like. In one embodiment, the wheels have a diameter of at least eight inches. In addition, wheels 42 and 44 preferably have a surface which is easy to clean mud or other debris from with a hose or the like in the event that mud, excrement or the like comes into contact with the wheels 42 and 44.

Base frame 38 also includes a lower central support section 46 that in the exemplary embodiment is connected directly to the lower end of lower shaft section 28. The outer end of lower support section 46 includes a downwardly directed foot member 48 having a length such that when wheels 42 and 44 and foot member 48 are both in contact with a flat ground surface, the collection station 10 is stably supported in a substantially horizontal upright position. Foot member 48 may have a rubber waterproof coating over its end.

In addition, frame members 50 and 52 form part of base frame 38, with frame member 50 extending between the outer end of crosspiece 40 near wheel 44 and the outer end of lower support section 46, and frame member 52 extending between the outer end of crosspiece 40 near wheel 42 and the outer end of lower support section 46. Crosspiece 40 and frame members 50 and 52 in one embodiment are made of metal rods which have been joined together by welding forming a stable triangular structure as part of base frame 38. Lower support shaft 28, lower support section 46, and foot member 48 may be provided as a single piece of hollow metal tubing that is bent into the desired configuration and then is connected to crosspiece 40 and frame members 50 and 52 also by welding, providing an overall rigid framework. Alternatively, the framework of mobile station 16 may be formed of other suitable materials such as aluminum or a plurality of hollow tubular plastic members secured together by appropriate connectors, or other materials. In another embodiment, base frame 38 may include an additional elliptically shaped member (not shown) which is secured to crosspiece 40 and members 50-52 by welding or other suitable means depending upon the particular materials used.

In another possible embodiment of the base frame, a first frame member may be positioned parallel to the shaft, such that two angles of the triangle described above occur along the parallel frame member and the third angle of the triangle pointing towards the shaft. A first and second foot member may then be positioned underneath the two angles of the triangle which occur along the parallel frame member. In another possible embodiment, the triangle formed by the support frame members is an isosceles or an equilateral triangle. In yet another embodiment, the shaft could be moved to a position underneath the circular base frame, in which case it will be understood that the wheels 42 and 44 must be large enough so that the base frame 38 is positioned high enough off the ground to be able to be tipped rearwardly without its rear surface impinging against or hitting the ground surface. The forwardly and outwardly triangular frame members may also be extended beyond the circular base frame in order to extend the position of foot members forwardly and outwardly to give the mobile station 16 a wider base and increased stability when in an upright position.

Base frame 38 is adapted to provide a support platform for carrying and supporting an animal waste bin or vessel, shown by way of non-limiting example as vessel 14. Vessel 14 is substantially made up of a main body section 54 which encapsulates a hollow interior, and having an upwardly facing mouth 56 (see FIG. 4) which is open to the hollow interior, and a bottom wall 58. Vessel 14 is adapted to be secured to mobile station 16 with bottom wall 58 supported on base frame 38 and resting on frame members 50 and 52 and lower support section 46. In addition, vessel 14 includes a lid member 59, described in greater detail below.

In the exemplary embodiment, another bracket member 60 is connected to lower shaft section 28 on the opposite side of shaft section 28 from base frame 38, the purpose of which is to hold lid member 39 as shown in FIG. 4. In addition, a vessel centering bracket 62 is connected to lower shaft section 28 on the same side of shaft section 28 as base frame 38. As best shown in FIG. 7, bracket 62 includes center section 63 which is secured to lower shaft section 28, a pair of angled semi-clasping arm sections 64 and 66 attached on either side of center section 63, and a pair of shorter outwardly angled sections 68 and 70 extending from the outer ends of arm sections 64 and 66, respectively. Each short angled section 68 and 70 has a through-aperture 71 therein. Bracket 62 is arranged to snugly receive the outer surface of vessel 14 against the surfaces of center section 63 and arm sections 64 and 66 of bracket 62 facing base frame 38 of the mobile station 16 when the vessel 14 is placed on base frame 38, such that vessel 14 cannot slide laterally to the side on base frame 38. A securing device such as strap member or cord 72 having connectors 74 on its ends is also provided, which is used to detachably secure vessel 14 to mobile station 16. Cord 72 is positioned around the outer surface of the vessel 14 and then connectors 74 which may be hook members are secured in the apertures 71 of short end sections 68 and 70 of bracket 62. Cord 72 is preferably made of an elastic material which when secured around the vessel 14 is stretched such that it will continually urge the vessel 14 against bracket 62.

In another embodiment, a further support structure which is provided in the form of a rigid tubular sleeve section is attached to base frame 38, and is dimensioned to receive the main body section 54 of vessel 14 within the sleeve section. In another somewhat less preferred embodiment, vessel 14 may be more securely fastened to mobile station 16 by bolting or other suitable means, although it is believed preferable in most instances for vessel 14 to be detachably supported on base frame 38 of mobile station 16, since this will make it easier for pet waste that has been accumulated in vessel 14 to be emptied and for the vessel 14 to be washed as needed.

In additional embodiments, the vessel 14 can be made securable and detachable to mobile station 16 on the support platform through provision of a latch mechanism having male and female parts. In this embodiment, a female latch member having an upwardly facing opening can be secured by welding or other suitable means depending upon the materials to shaft section 28 of shaft 24, in a position extending above base frame 38. A corresponding male latch member will then be secured by a suitable means to the outer surface of the vessel 14. The male latch member can have a downwardly directed flange which is sized to be inserted into or withdrawn from the opening in the female latch member in order to couple or decouple the latch mechanism. In one embodiment, the side surfaces of the opening in the female latch portion are slightly inwardly angled, while in another embodiment the latch mechanism includes V-shaped male and female members which when engaged the male latch portion will become securely wedged into the female latch portion, aided by gravity and the weight of the container 14. The male and female portions will automatically align when the vessel 14 is positioned over the base frame 38, and the female latch member will be positioned at a height such that the lower surface of the vessel 14 is resting on base frame 38 when the male and female latch portions are tightly joined.

In another embodiment, vessel 14 may be provided in a plurality of different sizes and/or dimensions from which purchasers can select depending upon their particular needs. It will be understood that as shown in the FIGS. all that is needed to secure a different sized or dimensioned container to mobile station 16 is a cord or strap 72 which is properly sized to tightly hold the vessel on the support platform of station 16 as described above. In other embodiments, irrespective of the size of the containers, each container will have a similar male latch member such as described above that can be mated with the female latch member on the shaft section 28. The animal waste collection station 10 of the present invention can therefore be easily customized for different users who may wish to obtain a set of containers having different sizes which can then be used interchangeably with collection station 10. In another embodiment, the position of the female latch member on shaft section 28 can be adjusted vertically in order to facilitate use with vessels 14 having different heights. In such case, markings may be provided on the shaft section 32 to instruct the user as to the position the female latch member should be secured to shaft section 28 depending on which size container is used.

It is important to the ease of use of the invention that mouth 56 of the pet waste collection vessel 14 be large enough to receive jaws 18 of pet waste collection apparatus 12 when said jaws 18 are in an open position. This allows the jaws 18 to be easily inserted into the mouth 56 of said vessel 14 to deposit waste collected by the apparatus 12, and then to open the jaws 18 to allow such waste to be transferred into the receptacle, after which the jaws 18 are removed from the vessel interior. In an embodiment, the interior of vessel 14 is covered with a liner apparatus such as a plastic or paper bag which can be removed from vessel 14 when full to be disposed of, after which a new liner apparatus can be placed in vessel 14, after the interior space of vessel 14 is wiped or cleaned using a suitable cleaner as may be necessary.

As indicated above, vessel 14 also has a lid member 59 which is tightly securable over mouth 56 of the vessel 14. Lid member 59 preferably includes a gasket or seal which engages with vessel 14 and reduces odors and the like from being emitted from vessel 14 when containing excrement or the like. In addition, a bracket 60 is provided on shaft section 28 which, as shown in FIG. 4 is adapted to hold lid member 59 when it is removed from vessel 14. In another embodiment, a hinged lid is provided which is adapted to pivotably cover upwardly facing open mouth 56 of vessel 14. In one embodiment, the lid may have an outwardly convex surface to facilitate water running off the lid when the lid is closed and station 10 is in an upright position. The lid may be arranged to open upwardly towards shaft sections 28 and 30 of mobile station 16, and in one embodiment may be hingedly secured by a hinge means directly to lower shaft section 28 of mobile station 16 such that vessel 14 is detachable from station 10 without the lid. Alternatively, the hinge and lid may be secured directly to vessel 14 in a known manner. In either case, the hinge allows for upward pivoting of the lid between an open position and a closed position, with the hinge serving as the axis about which the lid rotates. A means for locking the lid in a closed position over mouth 56 of vessel 14 may also be provided. The lid should have a reasonably tight fit on vessel 14 to prevent flies and other insects from entering the receptacle when the lid is closed, and also to minimize the odor emanating from the receptacle due to any collected waste in the receptacle.

In use, the pet waste collection station 10 is pushed or pulled on wheels 42 and 44 using handle 26 and is manually guided to a site or location where one or more masses of pet waste require picking up are located. Once station 10 has been moved into a suitably close proximity to the waste material, handle 26 is released and station 10 will normally automatically pivot such that foot member 48 is in contact with the ground surface, and station 10 is in a generally upright position, as shown in FIG. 1. The user may then remove the "pooper scooper" or other pet waste pick-up apparatus 12 from hook member 34 and use this device to collect or pick up a mass of pet waste in jaws 18 of the device. The lid on vessel 14 if present is removed and placed on bracket 60, and jaws 18 of the "pooper scooper" are positioned over mouth 56 of the vessel 14 and then maneuvered into the interior of vessel 14 to deposit the collected waste into such receptacle. In one embodiment, a hand lever is provided on handle 26 which is connected by a wire or the like to the lid and which is used to open and close the lid. The user can then move station 10 into close proximity to the location where another pet waste pickup is required, after which the user will essentially repeat the steps recited above to pick up and collect such pet waste. In another embodiment, a liner is provided over jaws 18 of the "pooper scooper", and an air freshener means may be provided in the lid or in vessel 14.

In one embodiment, the outer surface of main body section 54 of vessel 14 includes a decorative design, which design can be customized to provide almost any type of design or decorative surface, including the provision of advertising materials on the outer surface of the receptacles. The image or design is printed on a sheet that is then applied to outer surface of the vessel 14 in a suitable manner, such as by an adhesive or heat transfer means. In another embodiment, the outer surface of vessel 14 may be magnetic such that decorative magnets can be applied to the outer surface, enabling customization of the appearance of the receptacles 14.

In another embodiment, station 10 also includes a dispenser for holding and dispensing hand wipes or towelettes, which may be premoistened or presaturated with an antibacterial or disinfecting solution. The dispenser may be secured to shaft sections 28 and 30 of mobile station 16 or in another suitable place on mobile station 16. In another embodiment, station 10 also includes a dispenser for hand sanitizer. The hand sanitizer dispenser will also preferably be attached to mobile station 16, and will include a means for dispensing the sanitizer solution which typically will be in the form of a gel or spray. Suitably positioned holes may be provided in upper or lower shaft sections 28 and 30 for attachment of a hand wipe and hand sanitizer dispenser. In another embodiment, mobile station 16 of station 10 may include a pair of substantially parallel shaft sections which are secured together by one or more crosspieces, which would provide a larger framework or surface area for the attachment of multiple additional accessories.

In another embodiment, station 10 includes a storage compartment for storing and dispensing biodegradable fitted bags which are sized to be received in vessel 14. This storage compartment could be provided in base frame 38 underneath vessel 14, or in another suitable position on mobile station 16, and could be used to temporarily store other items such as small personal items of the user of station 10, for example a cell phone and keys. In another embodiment, a plurality of bags may be provided stacked one on top of the other in a flat package having a slit in the upper surface of the package through which the bags can be individually removed from the package and used. Preferably, the package can be stored in the bottom surface of the vessel 14, in which case the top bag could be simply removed from the package and secured in an open position in the receptacle. When filled, the bag could then simply be removed and another bag deployed. In an additional embodiment, one or more bags in the package may have a different color or other identifying indicia which will indicate to the user that the supply of bags will soon be depleted and a new package of bags should be purchased in the near future.

In another embodiment, station 10 is provided with at least one lighting device or headlight in order to illuminate the vessel 14, the ground surface immediately adjacent station 10 and preferably directed so as to illuminate the ground surface in the direction the station 10 is being moved on wheels 42 and 44, or both. A preferred position for mounting of the lighting device on mobile station 16 is near the upper end of upper shaft section 30, with the light being angled or directed downwardly and forwardly, although it will be understood that the lighting device or another lighting device can be attached to station 10 in a different position or with the light directed to the side or rear as preferred. In one embodiment, the angle of the lighting device is adjustable. The lighting device in one embodiment is a light emitting diode or LED light which is battery-operated and includes an on-off switch on the light housing so that users of station 10 can easily operate the lighting device.

In additional embodiments, a secondary receptacle can be provided, with said secondary receptacle being used for storing cleaning solution for which the jaws 18 of the pet waste collection apparatus 12 may be dipped into. This secondary receptacle may be detachably connected to the shaft 24 in a manner where said receptacle would not interfere with the positioning or placement of the wheels 42 and 44 or jaws 18 of the collection apparatus 12 when said apparatus 12 is hooked onto the mobile station 16. Alternatively, the secondary receptacle could be placed within vessel 14. In this embodiment, it is important that receptacles must be sized accordingly so that the mouth of vessel 14 is still fit to receive the width of open jaws 18 while also having the receptacle within itself, and so that the mouth of the receptacle is also fit to receive the jaws 18.

It will be immediately evident to those skilled in the art and in particular to those who have experienced the unenviable chore of repeatedly picking up multiple masses of pet waste, that the collection station 10, by providing a mobile station on which tools or implements that aid in such repeated waste collection are maintained together and moved into close proximity both to each other and which are easily moved to each collection site, that the overall amount of labor required to collect multiple piles of pet waste is substantially reduced. In addition, the tools and implements being utilized are maintained in an organized fashion attached to mobile station 16 of collection station 10.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

What is claimed is:

1. A mobile animal waste collection station comprising:
   a) a waste collection vessel, said vessel having a removable lid member;
   b) a mobile station, said mobile station having a base frame for supporting and carrying the waste collection vessel, a pair of wheels attached to the base frame, a foot member attached to the base frame spaced apart from the wheels for maintaining the mobile station in an upright orientation when stationary, an elongated shaft including a lower shaft section extending from the base frame and an upper shaft section that is telescopingly attached to the lower shaft section and terminating in a handle, a first mounting bracket attached to the upper section of the elongated shaft for holding an animal waste pickup tool to the mobile station, a second mounting bracket attached to the lower shaft section for holding the lid member when removed from the waste collection vessel, a waste collection vessel centering bracket, and a securing device;
   c) the centering bracket having a center section which is attached to the lower shaft section of the elongated shaft, a pair of semi-clasping arm sections positioned on opposite sides of the center section and angled extending over a portion of the base frame, and a pair of short angled sections which extend outwardly from the arm sections, the center section and arm sections being arranged to form a recess in which an outer surface of the waste collection vessel is positioned when the vessel is supported on the base frame to inhibit lateral sliding of the vessel on the base frame; and
   d) the securing device for securing the waste collection vessel on the frame including an elastic cord member which is securable to the short angled sections of the centering bracket and dimensioned to be placed around the collection vessel to secure the vessel to said mobile station.

2. A mobile animal waste collection station in accordance with claim 1 in which said pair of wheels are made of rubber and have a smooth outer surface.

3. A mobile animal waste collection station in accordance with claim 1 additionally comprising a pivot prevention bracket attached to the lower shaft section to prevent an animal waste pickup tool secured by the first bracket from pivoting away from the shaft section.

4. A mobile animal waste collection station in accordance with claim 3 additionally comprising an animal waste pickup tool.

5. A mobile animal waste collection station in accordance with claim 4 in which the animal waste pickup tool is a so-called "pooper scooper".

6. A mobile animal waste collection station in accordance with claim 1 in which the lid member includes a gasket for sealing engaging with the waste collection vessel.

7. A mobile animal waste collection station in accordance with claim 1 in which the base frame includes a triangular shaped platform.

8. A mobile wheeled animal waste collection station comprising:
   a base frame having a wheel axis and including a support platform for supporting a waste collection vessel having a removable lid member,
   an elongated shaft extending from the base frame and terminating in a handle,
   an animal waste pickup tool mounting bracket connected to the elongated shaft, and a lid member mounting bracket connected to the elongated shaft below the animal waste pickup tool mounting bracket,
   a waste collection centering bracket connected to the elongated shaft, the centering bracket having a center section which is secured to the elongated shaft, a pair of semi-clasping arm sections extending from opposite sides of the center section and angled over the base frame, the center section and arm sections forming a surface against which an outer surface of the waste collection vessel is snugly received to prevent lateral sliding of the vessel when supported on the platform, and a pair of short angled sections extending from outer edges of the arm sections, and
   a securing device for continually urging the waste collection vessel into contact with the centering bracket when supported on the platform, the securing device including strap member adapted to be placed around at least a portion of the waste collection vessel and secured to the short angled sections of the centering bracket.

9. The mobile animal waste collection station of claim 8 additionally comprising a through-aperture on at least one of the short angled sections.

10. The mobile animal waste collection station of claim 9 in which the strap member includes a connector on at least one end which is adapted to be received in one of the apertures in said short angled sections of the centering bracket.

11. The mobile animal waste collection station of claim 10 in which the strap member includes an elastic material.

12. The mobile animal waste collection station of claim 8 additionally comprising a pair of wheels rotatably attached to the base frame, and a foot member attached to the base frame in a spaced apart location from said wheels.

13. The mobile animal waste collection station of claim 12 in which the elongated shaft is telescoping.

* * * * *